United States Patent

Masel et al.

[15] 3,639,837
[45] Feb. 1, 1972

[54] METHODS OF AND APPARATUS FOR TESTING ELECTROMAGNETIC INDICATORS

[72] Inventors: Marvin Masel, Teaneck; Albert J. Wedlake, Totowa, both of N.J.
[73] Assignee: The Singer Company, New York, N.Y.
[22] Filed: Sept. 23, 1970
[21] Appl. No.: 74,781

[52] U.S. Cl. .................................. 324/158 R, 324/74
[51] Int. Cl. .................................. G01r 35/00, G01r 35/02
[58] Field of Search .................. 324/158 SY, 158 SM, 158 R, 324/146, 55, 74; 340/378 R, 324 R, 195, 198, 319; 323/51; 336/135

[56] References Cited

UNITED STATES PATENTS 3,368,142  2/1968  Bouchard et al. ................... 340/198 X Primary Examiner—Rudolph V. Rolinec
Assistant Examiner—Ernest F. Karlsen
Attorney—S. A. Giarratana and Thomas W. Kennedy

[57] ABSTRACT

An electromagnetic indicator can be tested to determine whether or not it is properly positioned to the desired indicia. This is achieved by applying electrical signals to two stator windings of the electromagnetic indicator so as to induce an electrical signal in a third of the stator windings. The induced signal varies depending upon the position of the indicia of the electromagnetic indicator. The stator windings are selected such that an induced signal of predetermined phase and of predetermined magnitude is obtained for an accurately positioned indicia.

9 Claims, 53 Drawing Figures

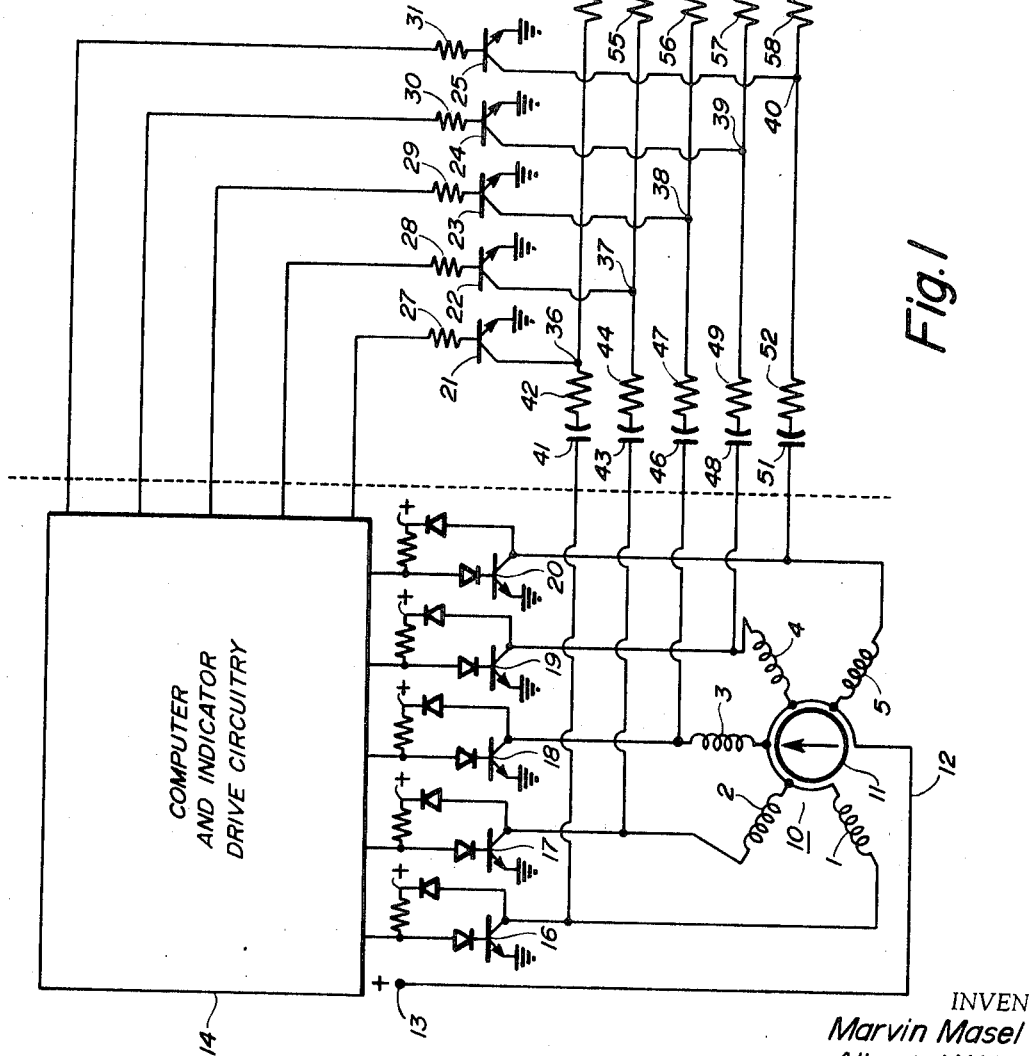

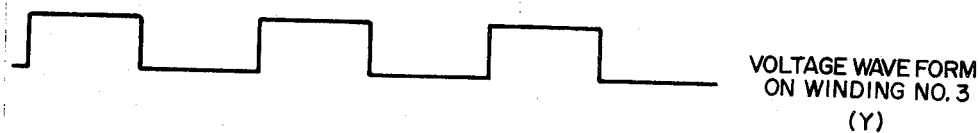
Fig. 4a — VOLTAGE WAVE FORM ON WINDING NO. 3 (Y)
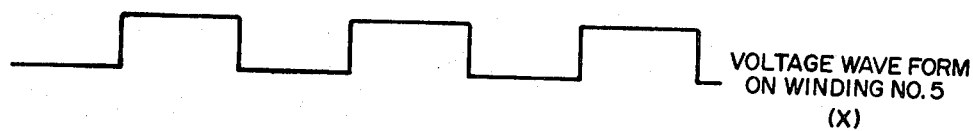
Fig. 4b — VOLTAGE WAVE FORM ON WINDING NO. 5 (X)
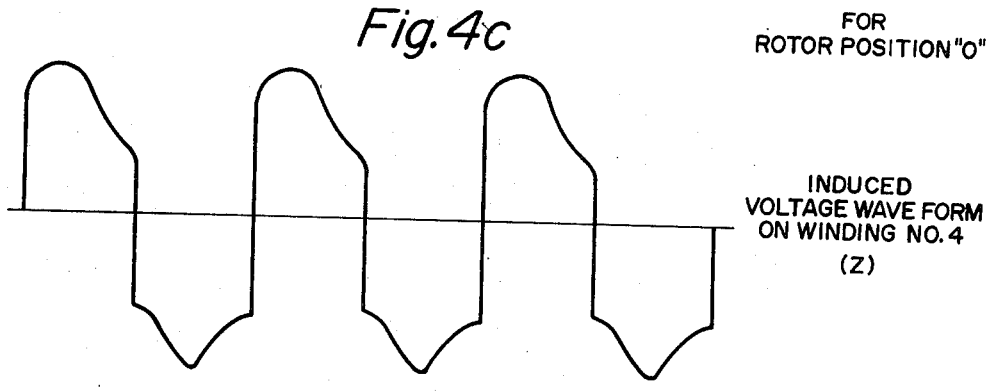
Fig. 4c — FOR ROTOR POSITION "0" — INDUCED VOLTAGE WAVE FORM ON WINDING NO. 4 (Z)
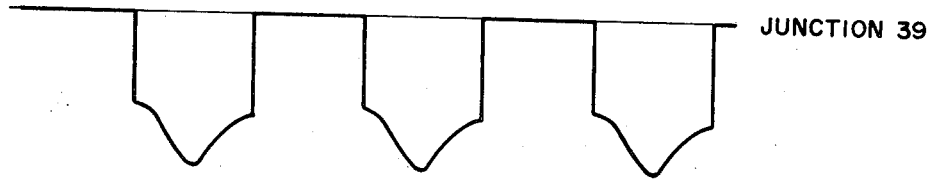
Fig. 4d — JUNCTION 39
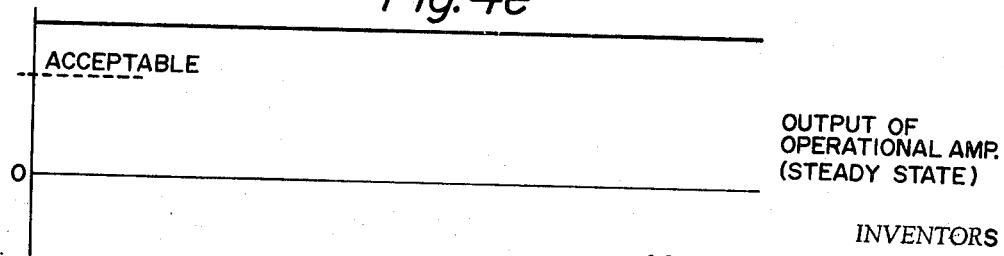
Fig. 4e — OUTPUT OF OPERATIONAL AMP. (STEADY STATE)
INVENTORS
Marvin Masel
Albert J. Wedlake

VOLTAGE WAVE FORM ON WINDING NO. 3 (Y)

VOLTAGE WAVE FORM ON WINDING NO. 5 (X)

FOR ROTOR POSITION "1"

INDUCED VOLTAGE WAVE FORM ON WINDING NO. 4 (Z)

JUNCTION 39

OUTPUT OF OPERATIONAL AMP. (STEADY STATE)

INVENTORS
Marvin Masel
Albert J. Wedlake

Fig. 6a
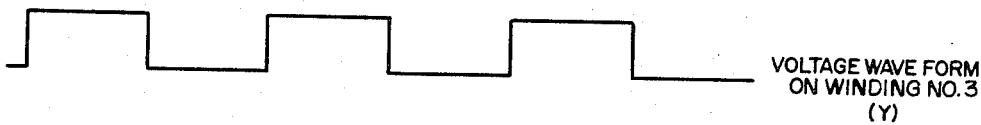
VOLTAGE WAVE FORM ON WINDING NO. 3 (Y)
Fig. 6b
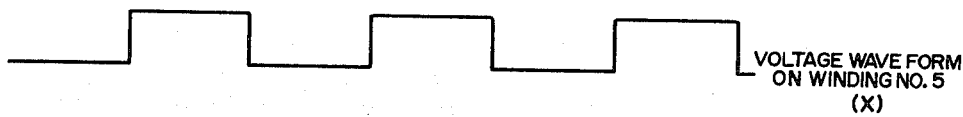
VOLTAGE WAVE FORM ON WINDING NO. 5 (X)
Fig. 6c
FOR ROTOR POSITION "2"
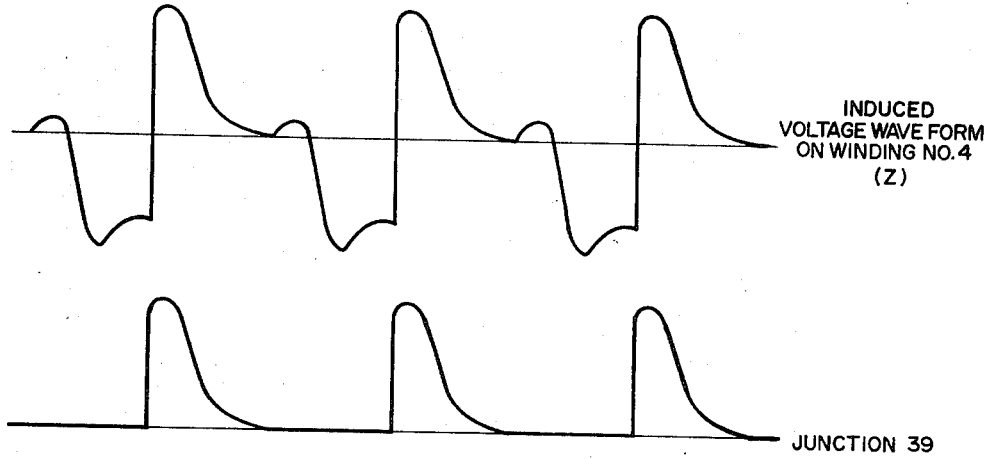
INDUCED VOLTAGE WAVE FORM ON WINDING NO. 4 (Z)
JUNCTION 39
Fig. 6d
Fig. 6e
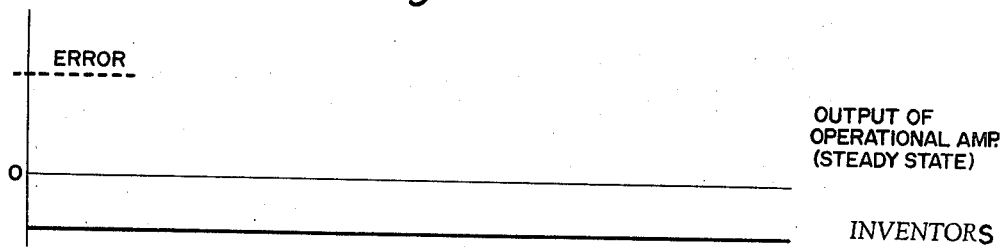
OUTPUT OF OPERATIONAL AMP. (STEADY STATE)

Fig. 7a
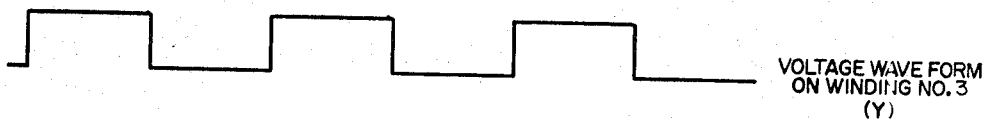
VOLTAGE WAVE FORM ON WINDING NO. 3 (Y)
Fig. 7b
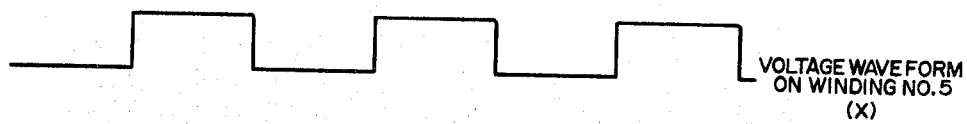
VOLTAGE WAVE FORM ON WINDING NO. 5 (X)
Fig. 7c
FOR ROTOR POSITION "3"
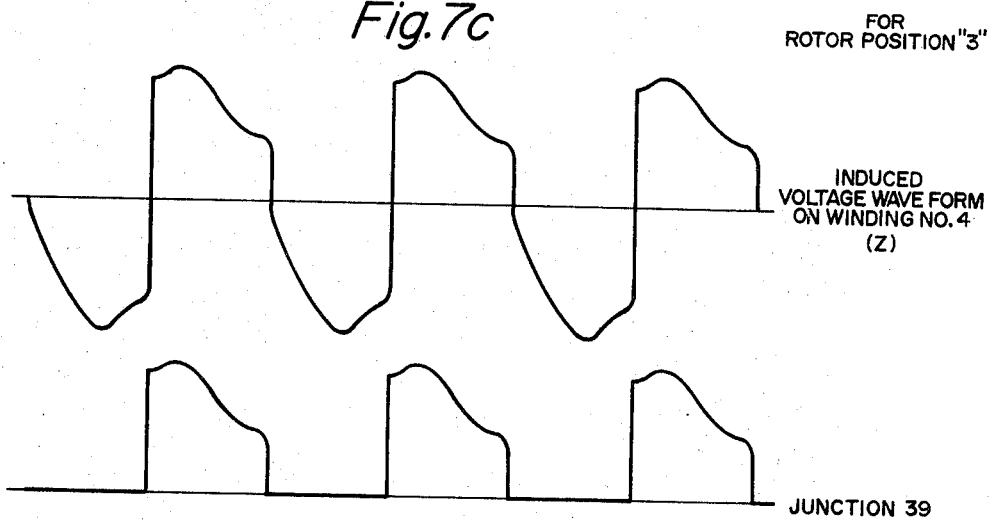
INDUCED VOLTAGE WAVE FORM ON WINDING NO. 4 (Z)
JUNCTION 39
Fig. 7d
Fig. 7e
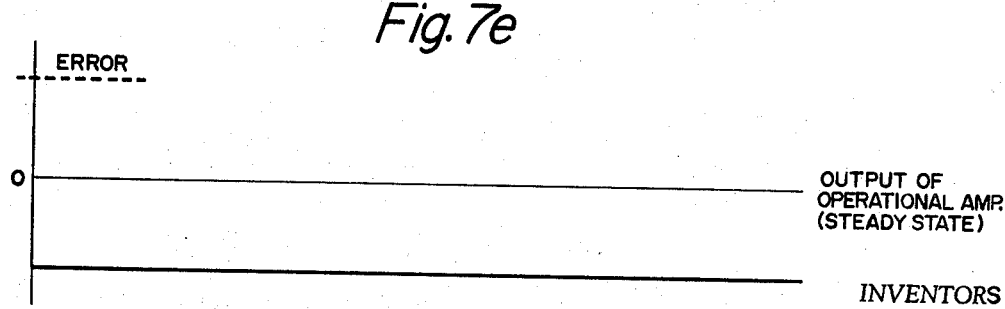
OUTPUT OF OPERATIONAL AMP. (STEADY STATE)
INVENTORS
Marvin Masel
Albert J. Wedlake
BY Thomas W. Kennedy
S. A. Giovratana
ATTORNEY

VOLTAGE WAVE FORM ON WINDING NO. 3 (Y)

VOLTAGE WAVE FORM ON WINDING NO. 5 (X)

FOR ROTOR POSITION "4"

INDUCED VOLTAGE WAVE FORM ON WINDING NO. 4 (Z)

JUNCTION 39

ERROR

OUTPUT OF OPERATIONAL AMP. (STEADY STATE)

VOLTAGE WAVE FORM
ON WINDING NO. 3
(Y)

VOLTAGE WAVE FORM
ON WINDING NO. 5
(X)

FOR
ROTOR POSITION "5"

INDUCED
VOLTAGE WAVE FORM
ON WINDING NO. 4
(Z)

JUNCTION 39

ACCEPTABLE

OUTPUT OF
OPERATIONAL AMP.
(STEADY STATE)

INVENTORS
Marvin Masel
Albert J. Wedlake

BY *Thomas W. Kennedy*
*S. A. Giavrea...*
ATTORNEY

Fig. 10a
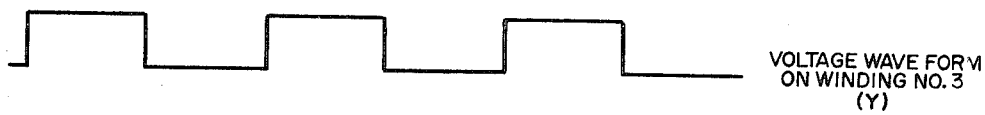
VOLTAGE WAVE FORM ON WINDING NO. 3 (Y)
Fig. 10b
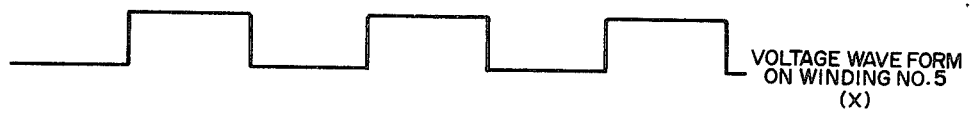
VOLTAGE WAVE FORM ON WINDING NO. 5 (X)
FOR ROTOR POSITION "6"
Fig. 10c
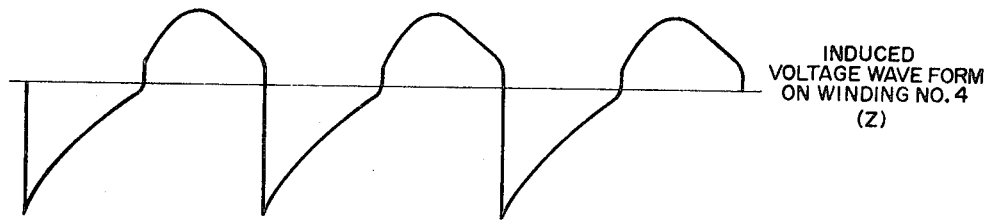
INDUCED VOLTAGE WAVE FORM ON WINDING NO. 4 (Z)
Fig. 10d
JUNCTION 39
Fig. 10e
ERROR
OUTPUT OF OPERATIONAL AMP. (STEADY STATE)
INVENTORS
Marvin Masel
Albert J. Wedlake
BY Thomas W. Kennedy
ATTORNEY

Fig. 11a
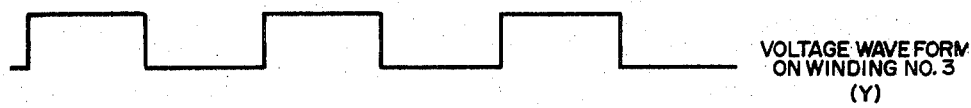
VOLTAGE WAVE FORM ON WINDING NO. 3 (Y)
Fig. 11b
VOLTAGE WAVE FORM ON WINDING NO. 5 (X)
FOR ROTOR POSITION "7"
Fig. 11c
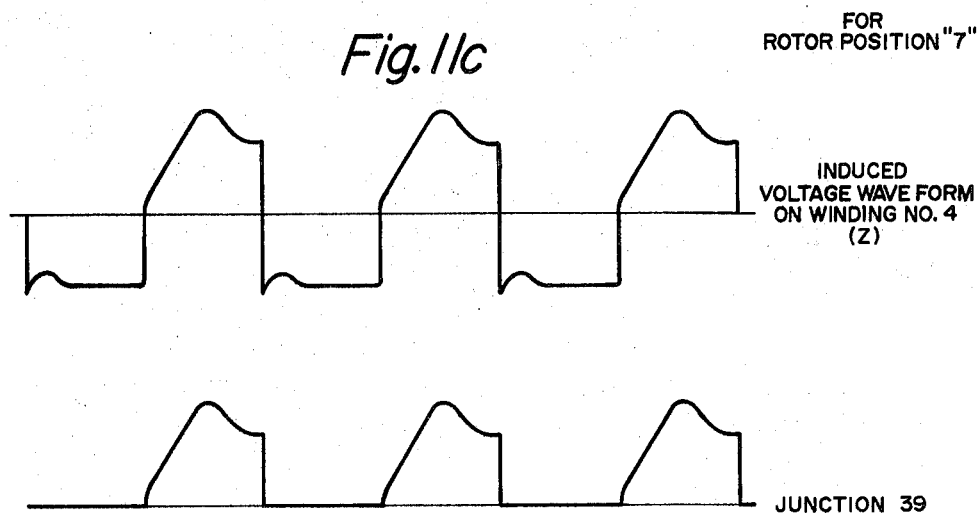
INDUCED VOLTAGE WAVE FORM ON WINDING NO. 4 (Z)
JUNCTION 39
Fig. 11d
Fig. 11e
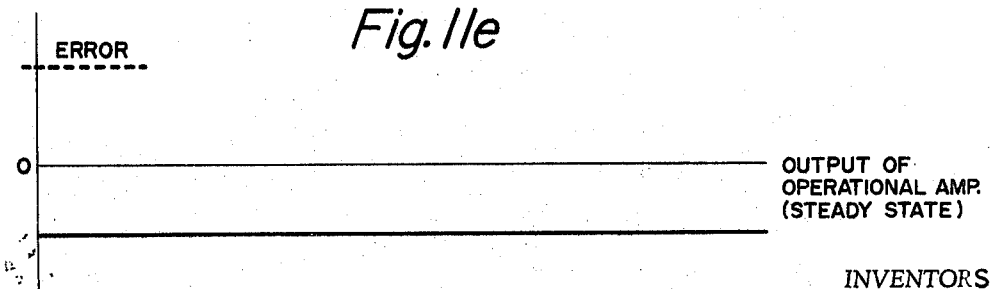
OUTPUT OF OPERATIONAL AMP. (STEADY STATE)
INVENTORS
Marvin Masel
Albert J. Wedlake
BY Thomas W. Kennedy
ATTORNEY

VOLTAGE WAVE FORM ON WINDING NO. 3 (Y)

VOLTAGE WAVE FORM ON WINDING NO. 5 (X)

FOR ROTOR POSITION "8"

INDUCED VOLTAGE WAVE FORM ON WINDING NO. 4 (Z)

JUNCTION 39

OUTPUT OF OPERATIONAL AMP. (STEADY STATE)

INVENTORS
Marvin Masel
Albert J. Wedlake

BY Thomas W. Kennedy
   J. A. Giarratana
                 ATTORNEY

VOLTAGE WAVE FORM ON WINDING NO. 3 (Y)

VOLTAGE WAVE FORM ON WINDING NO. 5 (X)

FOR ROTOR POSITION " ɔ "

INDUCED VOLTAGE WAVE FORM ON WINDING NO. 4 (Z)

JUNCTION 39

OUTPUT OF OPERATIONAL AMP. (STEADY STATE)

INVENTORS
Marvin Masel
Albert J. Wedlake

BY Thomas W. Kennedy
ATTORNEY

METHODS OF AND APPARATUS FOR TESTING ELECTROMAGNETIC INDICATORS

BACKGROUND OF THE INVENTION

This invention relates to methods of and apparatus for testing electromagnetic indicators. Accordingly, the general objects of the invention are to provide new and improved methods and apparatus of such character.

Electromagnetic indicators which are positioned by energizing either one or two out of five windings are widely used as numeric readouts for a digital computer. These indicators have the advantage of being easily readable under bright, ambient lighting conditions and also have magnetic detent characteristics so that standby power is not required. They have very high reliability and long life in comparison with tungsten filament lamps, for example. They are designed for operation from a variety of digital computer signals. They provide an inherent magnetic memory that requires no holding power between changes. Indicators can be supplied as single elements or as stacked assemblies in a single housing to present either a multiple-digit or alphanumeric display. In construction, the only moving part in each indicator, usually, is the readout drum, which is an integral part of the rotating magnetic assembly. Positioning of the readout drum is controlled by energizing combinations of windings in the indicator's fixed stator assembly. Electromagnetic indicators of the prior art feature magnetic detenting and low excitation power. They are comparatively compact and lightweight and have rapid response times. They operate in high shock and vibration environments; readout remains visible even when power fails. No gears, cams, tapes, electrical contacts, brushes, filaments or lamps are required.

There is one significant drawback to the use of electromagnetic indicators, especially where high reliability is desired, such as in aerospace applications. Prior to this invention, there has been no satisfactory method of or means for self-testing these indicators under actual operating conditions.

SUMMARY OF THE INVENTION

Another object of this invention is to provide new and improved methods of and apparatus for self-testing electromagnetic indicators.

It is another object of this invention to provide new and improved methods of and apparatus for testing electromagnetic indicators under actual operating conditions.

With these and other objects in mind, electromagnetic indicators of the type having a permanent magnet rotor with indicia spaced thereabout and fixed stator windings in association therewith, whereby energization of selected stator windings causes the rotor to position the indicia to a corresponding relationship, can be tested. The testing is achieved by the application of a first periodic electrical waveform to one of the stator windings. A second periodic electrical waveform is applied to a second of the stator windings. Both electrical waveforms are of frequencies that are sufficiently high so that the rotor does not rotate by the application of those waveforms. An electrical waveform that is induced in a third of the stator windings is sensed and its magnitude and phase are compared with the standard. An error signal is produced when either the sensed waveform is out of phase with the standard or when the sensed waveform is of a magnitude less than the standard.

More specifically, the invention contemplates methods of and apparatus for simultaneously testing a plurality of electromagnetic indicators of the type each having a permanent magnet rotor with 10 numerical digits spaced thereabout, whereby energization of one or two of five selected stator windings equally spaced cyclically about the rotor causes the rotor to position the digits in a corresponding relationship. Such testing can be achieved by the application of a first periodic electrical waveform at a fixed frequency rate to a corresponding stator winding X for each indicator. A second periodic electrical waveform is applied at the same fixed frequency rate, but out of phase with the first waveform, to the corresponding stator winding Y for each indicator, both of the electrical waveforms being of frequencies that are sufficiently high whereby the rotors do not rotate by the application of such waveforms. Electrical waveforms, induced in the corresponding stator winding Z for each indicator, are sensed and coupled periodically, at the same fixed frequency rate, to a point of reference potential so that half-wave sampling takes place. The half-wave sampled waveforms are amplified and filtered so as to yield DC voltages. The minimum yielded DC voltage is compared against a standard, and an error signal is produced whenever the minimum DC voltage is of an insufficient amplitude. The values X, Y, and Z, referred to hereinabove, are cyclically numbered, such that, to test for 0 or 5, X=5, Y=3, Z=4; to test for 1 or 6, X=3, Y=1, Z=2; to test for 2 or 7, X=1, Y=4, Z=5; to test for 3 or 8, X=4, Y=2, Z=3; and to test for 4 or 9, X=2, Y=5, Z=1.

BRIEF DESCRIPTION OF THE DRAWINGS

Other objects, advantages, and aspects of the invention will become apparent by reference to the following detailed specification and drawings of a specific embodiment thereof, wherein:

FIG. 1 is an electrical schematic diagram of one embodiment of the invention;

FIG. 2 is a table indicating which one or two of the stator windings, indicated as "LOGIC," should be energized for any desired numeric "INDICIA";

FIG. 3 is a table indicating, for a given INDICIA, which windings X and Y are to have electrical signals applied thereto for purposes of tests, and which winding Z is to be sensed;

FIG. 4a–4e is a set of waveforms on a common time scale, illustrating for X=5, Y=3, Z=4, and for an indicator rotor indicia position of "0," a series (a) of voltage pluses applied to winding 3, a series (b) of voltage pulses applied to winding 5, a series (c) of induced voltage pulses on winding 4, a half-wave sampled set (d) of induced pulses, and an amplified, filtered level (e) produced from the sampled pulses;

FIG. 6a–6e is a set of waveforms, similar to those shown in FIG. 4, for an indicator rotor indicia position of "2";

FIG. 7a–7e is a set of waveforms, similar to those shown in FIG. 4, for an indicator rotor indicia position of "3";

FIG. 10a–10e is a set of waveforms, similar to those shown in FIG. 4, for an indicator rotor indicia position of "6";

FIG. 11a–11e is a set of waveforms, similar to those shown in FIG. 4, for an indicator rotor indicia position of "7";

Referring to FIG. 1, there is shown an electromagnetic indicator 10 having a rotor 11 and a plurality of stator windings 1, 2, 3, 4, 5 spaced cyclically about the rotor 11. Each of the stator windings 1, 2, 3, 4, 5 is coupled to a common line 12 which is coupled to a common positive polarity source 13.

The electromagnetic indicator rotor 11 has a horizontal permanent magnet which is attracted to one of the five windings 1, 2, 3, 4, 5 when one of the five windings is actuated; the magnet is attracted to the midpoint of the two adjacent windings when those two adjacent windings are actuated. The magnet need not necessarily be horizontal; it should be oriented across the diameter of the rotor 11.

The illustration in FIG. 1 of the five windings 1, 2, 3, 4, 5 spaced equiangularly about the rotor 11, and the rotor 11 being shown as a magnet having a single north pole, is meant for illustrative symbolic purposes, since many physical variations are known to the art.

In normal operation, as is well known to the prior art, a computer and/or indicator drive circuitry 14 selects one or two of five drive transistors 16, 17, 18, 19, 20 to position the rotor 11. A table showing the windings 1, 2, 3, 4, 5 requiring energization for each INDICIA is shown in FIG. 2.

Figure 5A:
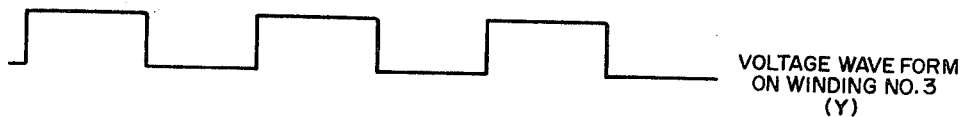
FIG. 5a–5e is a set of waveforms, similar to those shown in FIG. 4, for an indicator rotor indicia position of "1"
Figure 5B:
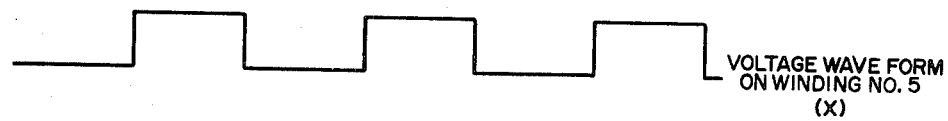
Figure 5C:
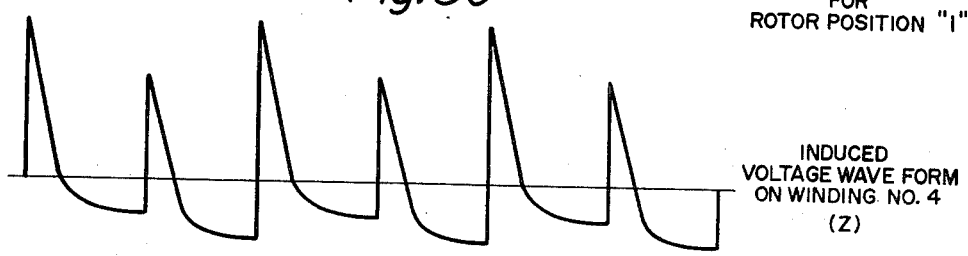
Figure 5D:
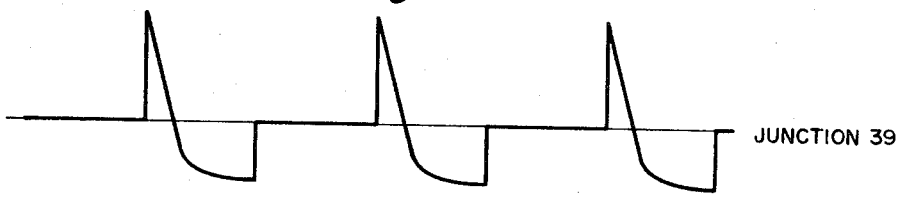
Figure 5E:
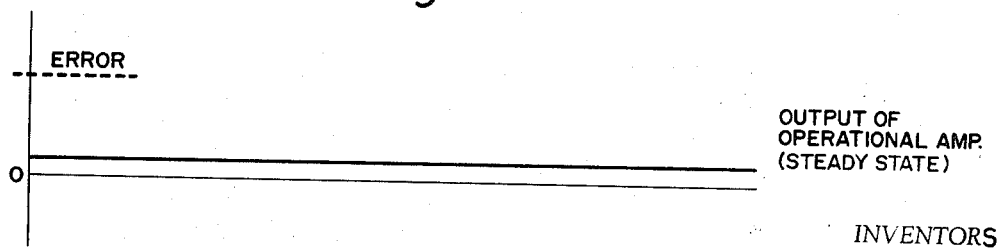
Figure 8A:
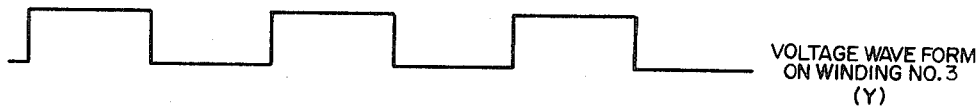
FIG. 8a–8e is a set of waveforms, similar to those shown in FIG. 4, for an indicator rotor indicia position of "4"
Figure 8B:
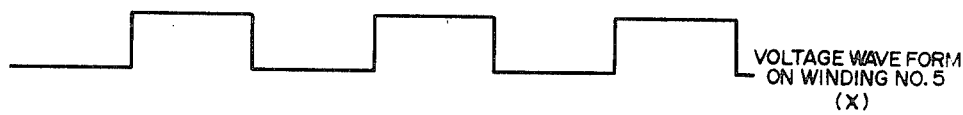
Figure 8C:
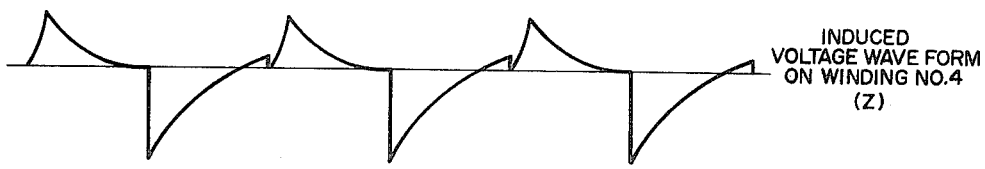
Figure 8D:
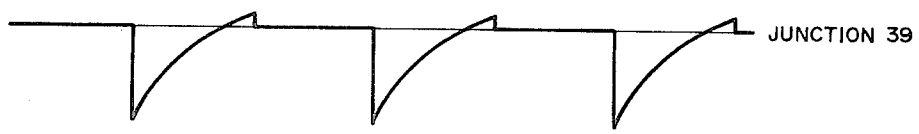
Figure 8E:
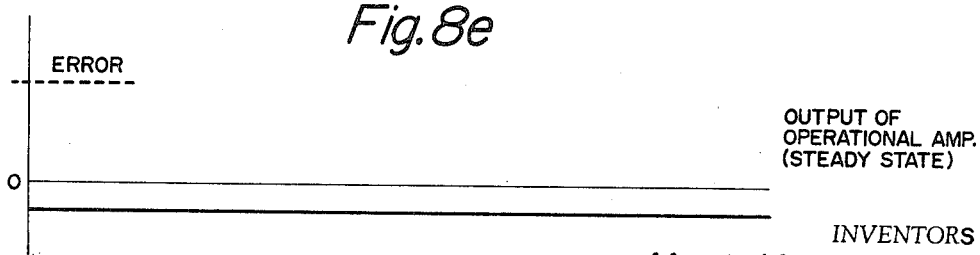
Figure 9A:
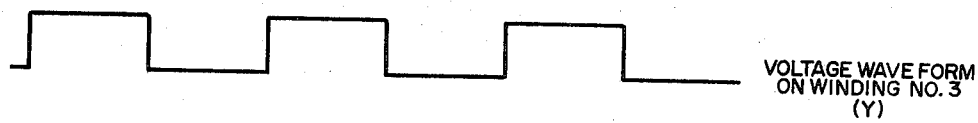
FIG. 9a–9e is a set of waveforms, similar to those shown in FIG. 4, for an indicator rotor indicia position of "5"
Figure 9B:
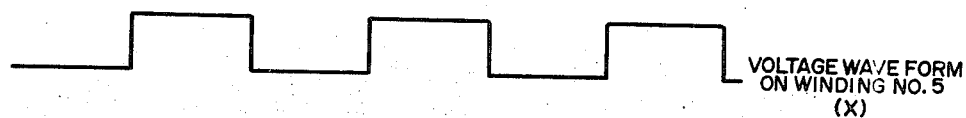
Figure 9C:
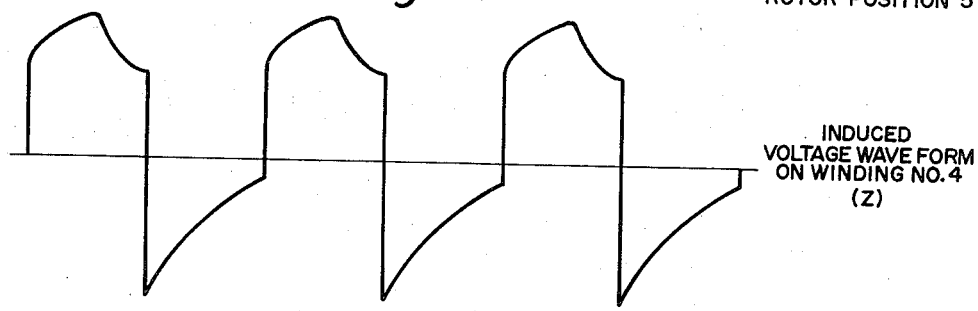
Figure 9D:
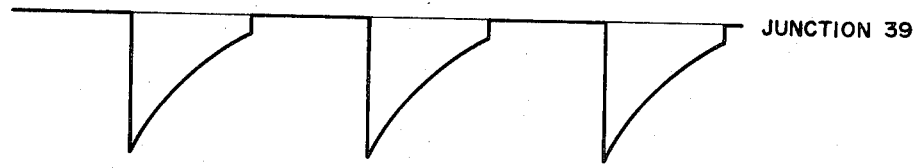
Figure 9E:
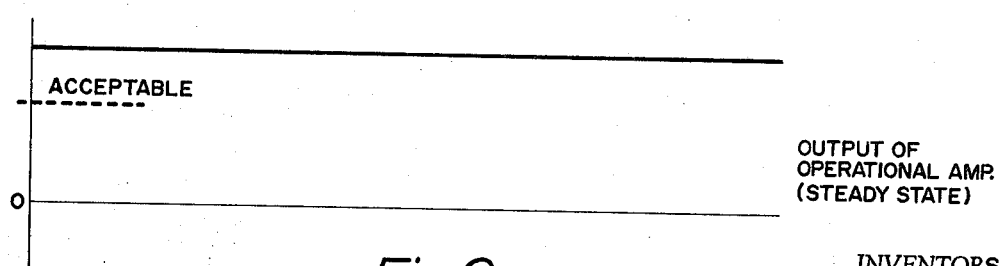
Figure 12A:
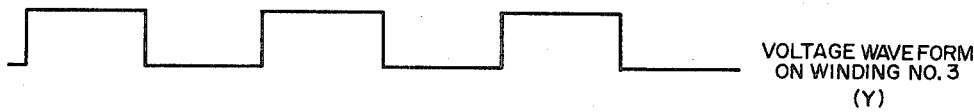
FIG. 12a–12e is a set of waveforms, similar to those shown in fIG. 4, for an indicator rotor indicia position of "8"
Figure 12B:
Figure 12C:
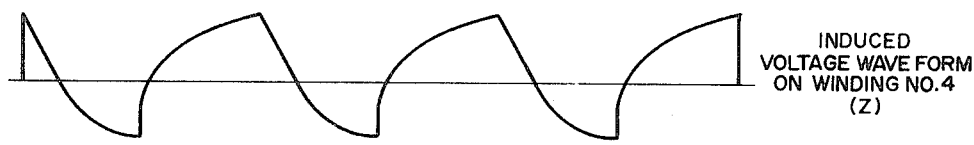
Figure 12D:
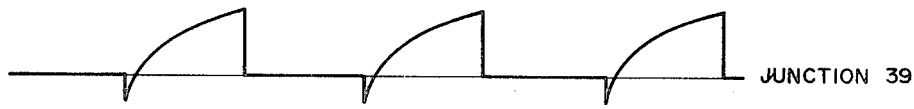
Figure 12E:
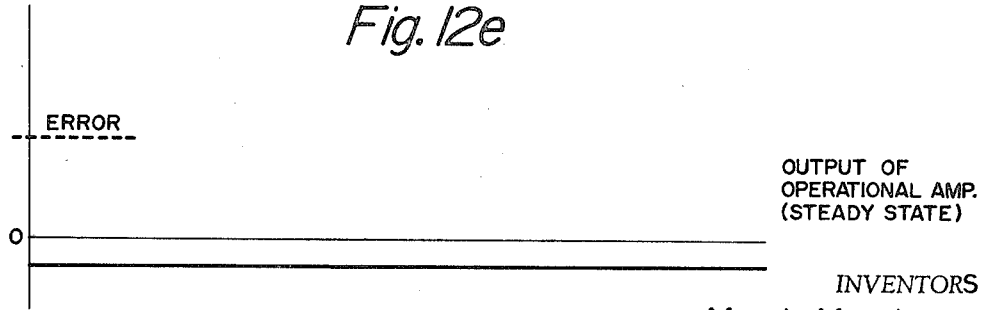
Figure 13A:
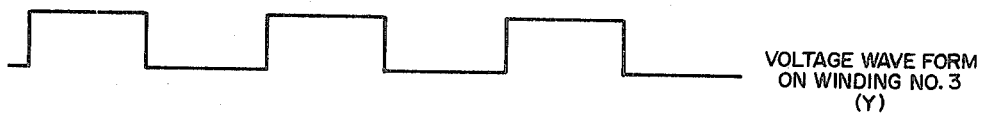
FIG. 13a–13e is a set of waveforms, similar to those shown in FIG. 4, for an indicator rotor indicia position of "9."
Figure 13B:
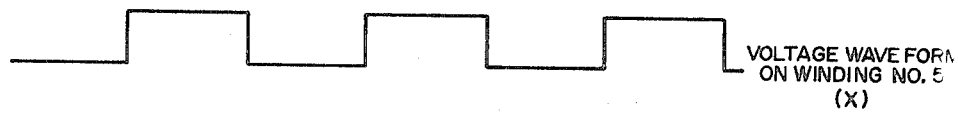
Figure 13C:
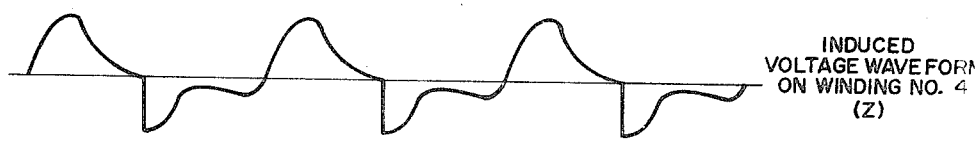
Figure 13D:
Figure 13E:
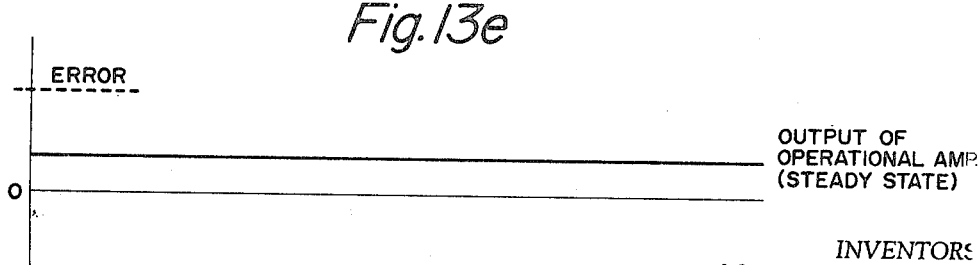

By alternately pulsing two of the windings 1, 2, 3, 4, 5 at a high rate and by sensing the voltage induced on a third winding, a failure in positioning the indicator rotor 11 can be detected. FIGS. 4 to 13 illustrate the voltage waveforms induced in the winding 4 when windings 3 and 5 are pulsed as described hereinafter, for rotor position 0 through 9, respectively. For a 15-volt excitation of the indicator common terminal 13, the maximum amplitude of the induced waveform is of the order of one-half volt peak to peak.

From a review of FIGS. 4 to 13, it is seen that the relative phase and magnitude of the induced waveform varies with rotor position. For 0 and 5 as INDICIA (see FIGS. 4 and 9), it is noted that the induced voltage is in phase with the indicator drive transistor excitation, while for 3 and 7 (see FIGS. 7 and 11), a maximum out-of-phase relationship exits. Other rotor positions show intermediate characteristics.

While alternately pulsing the proper windings and by using the pulsing waveform to demodulate or sample the induced voltage on a properly selected winding, a phase-sensitive DC voltage can be developed to determine whether an indicator has failed.

Referring again to FIG. 1, there is shown, to the right of the dotted line, circuitry for self-testing the electromagnetic indicator 10.

The circuitry includes five test transistors 21, 22, 23, 24, 25, the bases of which are coupled via base resistors 27, 28, 29, 30, 31, respectively, to the computer and indicator drive circuitry 14. The emitters of the test transistors 21, 22, 23, 24, 25 are coupled to a point of reference potential, such as ground. The collectors of the transistors 21, 22, 23, 24, 25 are connected to common junction terminals 36, 37, 38, 39, 40, respectively. The stator winding 1 is coupled via a DC blocking capacitor 41, and a serially connected resistor 42 to the junction terminal 36. The stator winding 2 is coupled via a DC blocking capacitor 43 and a serially connected resistor 44 to the junction terminal 37. The stator winding 3 is coupled by a DC blocking capacitor 46 and a serially connected resistor 47 to the junction terminal 38. Similarly, the stator winding 4 is coupled by a DC blocking capacitor 48 and a serially connected resistor 49 to the junction terminal 39 and, likewise, the stator winding 5 is coupled via a DC blocking capacitor 51 and a serially connected resistor 52 to the junction terminal 40. The junction terminals 36, 37, 38, 39, 40 are coupled, respectively, via resistors 54, 55, 56, 57, 58 to a common junction 59. The common junction 59 is connected to the negative input terminal of an operational amplifier 61. The positive input terminal of the operational amplifier 61 is connected to a point of reference potential, such as ground. The output of the operational amplifier 61 is connected to its negative input terminal via a parallel connection of a feedback capacitor 62 and a resistor 63.

The output of the operational amplifier 61 is coupled to the cathode of a diode 64 whose anode is connected to a junction terminal 66. In a similar fashion, other similar test circuits for other electromagnetic indicators (not shown) are coupled via diodes 64', 64'', etc., to the common junction terminal 66. The junction terminal 66 is coupled via a voltage dropping resistor 67 to a point of positive voltage source +V. The junction terminal 66 is also connected to a comparing amplifier 68 which has one input coupled to a point of reference voltage and has a "strobe" terminal adapted to be actuated periodically in an interrogating manner. The output of the amplifier 68 is coupled to means for indicating an error. Such means may be, for example, a light, an audible alarm, or can be an instruction to the computer to indicate that an error has taken place.

In operation, assume that the electromagnetic indicator 11 should be, and actually is, indicating a "0." This was achieved by previously driving the stator winding 1, as indicated by the table shown in FIG. 2. To test for an indicia of "0" as indicated in FIG. 3, the winding 5 is driven by a chain of pulses (FIG. 4a) coincidentally with the application of a chain of pulses (FIG. 4b) applied to the winding 3. The voltage induced in the winding 4 is depicted in FIG. 4c.

The windings 3 and 5 are alternately pulsed by turning on transistors 18, 20 with square wave pulses, while the winding 4 is "read." When half-wave sampled (FIG. 4d), amplified, filtered, and integrated, a voltage level (FIG. 4e) will be produced which exceeds a fixed threshold value, thus indicating an acceptable indicia. Such will be the case when the electromagnetic indicator is functioning properly.

It is not critical whether the transistors 18, 20 are turned on and off with square waves or sinusoidal waves, but simply that they are turned on and off. The demodulating test transistor 30 is turned on and off in synchronism with the transistor 18. When the indicator 11 properly is at the "0" position, the output from the winding 4 tends to be sinusoidal (FIG. 4c) in phase with the demodulating voltage, the current being in phase with the driving voltage. However, the positive halves of the waves are grounded by the demodulating transistor 30, so that all that appears at the input of the operational amplifier 61, is, in effect, negative half-waves of current. The negative half-waves of current, when fed into the inverting operational amplifier 61, due to the filtering feedback capacitor 62, are integrated to a particular positive DC voltage. This positive DC voltage, when the indicator 11 is at the proper position, is at a maximum magnitude, as shown in FIG. 4. In one example, the magnitude was in the neighborhood of 1.6 volts.

However, when the electromagnetic indicator 11 does not function properly, in that the erroneous indicia was being indicated when it should read "0" for example, then one of the sets of the waveforms as shown in FIGS. 5 through 13 occur. When the indicator is at an erroneous position, a voltage will be read from the amplifier 61 output at a magnitude substantially less than 1.6 volts. The 1.6 volts output, or less, are grouped together via the diodes 64, 64', 64'' (they are isolating diodes) and the resistor 67 to the +V source, to an amplifier 68 which acts as a threshold detector, so that the input thereto for a correct level should be about 2.1 volts, due to the voltage drop across the diodes 64, 64', 64''. This 2.1 volts should be slightly higher than the V ref, which is in the neighborhood of 1.9 to 2.0 volts. The amplifier 68 is strobed, and a failure is indicated by a high level from the output of the amplifier 68.

In the example given, wherein the stator winding 4 is being sensed during a test interval, the test transistors 21, 22, 23, 25 other than the one associated with the stator winding 4, are so biased that they conduct, whereby the junctions 36, 37, 38, 40 are effectively connected to ground. The fourth test transistor 24 is periodically clocked at the same frequency rate by the computer and indicator drive circuitry 14 so that the waveform from the stator winding 4 is half-wave chopped, or sampled, to provide a train of half-wave voltage pulses. These voltage pulses are applied via the resistor 57 to the common terminal 59 to the negative input terminal of the operational amplifier 61. An integrating action takes place in the operation amplifier 61 due to the capacitor 62. More particularly, the capacitor 62 filters the high frequency applied thereto so as to convert the pulsating half-wave sampled input to a phase-sensitive DC voltage output. The output of the amplifier 61, in a few cycles, appears as a steady-state voltage. This steady-state voltage, in a desired embodiment, is comparatively high whereby the diode 64 does not conduct. When the diode 64 does not conduct, and when other indicators are testing properly, their corresponding diodes 64' and 64'' do not conduct. When the diodes 64, 64', 64'' do not conduct, as current flows through the resistor 67 and, hence, the voltage at the common terminal 66 is at the level +V. The voltage +V at the common terminal 66 is slightly higher than the voltage V ref so that, upon being strobed, the amplifier 68 provides an indication that no error takes place. This failure indicating voltage can be coupled to a failure indicator, a light, an alarm, or otherwise coupled back to the computer system to indicate a failure.

In the event, however, that an error did occur, the induced signal from a sensed stator winding would be of insufficient magnitude and/or improper phase, such that, upon the demodulating action of applying the pulsating waveform to the corresponding test transistor, the demodulated voltage at the common junction 39 would not have an average magnitude of a sufficiently high value. Assuming that, when deleting half of a cycle that either the signal is too weak that remains or is of improper phase, then the operational amplifier 61 produces a signal at the output thereof which is somewhat indicative or a function of the average voltage that appears at the common junction terminal 59. This average voltage would be of a comparatively low value such that conduction takes place through the diode 64. When the diode 64 conducts, current is drawn through the resistor 67, causing a voltage drop thereacross, whereby the voltage at the common junction 66 drops in value. Hence, when the amplifier 68 is strobed to check for comparison between V ref and the voltage at the terminal 66, a suitable indication is given that an error has taken place.

The signals from each of five windings 1, 2, 3, 4, 5 are coupled through the DC blocking capacitors 41, 43, 46, 48, 51 and the series resistors 42, 44, 47, 49, 52 to the summing junction 59 of the DC operational amplifier 61. Four of the transistors 21, 22, 23, 24, 25 are forced to conduct during the self-testing operation, while the fifth transistor is turned on and off in synchronism with the pulsing current of two selected windings. As an example, when the computer 14 has "written" the indicia "0" into the indicator by turning the winding 1 on for about a half-second, and then removing power from the winding 1, it is possible to subsequently check whether the indicator rotor is at the proper position by pulsing the windings 3 and 5 at a 5,000 pulse per second rate while pulsing the "built-in test equipment" transistor 24 on and off in synchronism with the winding drive transistor 20. The built-in test equipment transistors 21, 22, 23, 25 are forced to conduct continuously during the self-test operation. The current flowing into the summing junction 59 of the operational amplifier 61 produces the phase-sensitive DC voltage at the amplifier 61 output. The capacitor 62, in the feedback path of the operational amplifier 61, filters the 5,000 hertz fundamental and higher harmonics with a time constant of about one five-hundredths second. The scaling that was used in one embodiment involved an amplifier feedback resistor 63 10 times the sum of the two input resistors 49 and 57. For 0 or 5 output indicia, the amplifier output is about 1.6 volts. The diodes 64, 64', 64'' connecting the output of the operational amplifiers 61 with a test circuitry for a large number of other indicators select the lowest indicator voltage for comparison with the voltage reference. Thus, when the test circuitry is so scaled that a correct rotor position causes 1.6-volt output of the amplifier 61, the amplifier 68 input should be about one diode drop higher or about 2.1 volts. A reference of about 1.5 volts as a failure criteria can be selected, allowing for various tolerances. When any one of the amplifier 61 outputs, then is less than, say, 1 volt and the comparing amplifier 68 is strobed, a signal can be sent to a failure indicator. By observing the table shown in FIG. 3, it is apparent that two indicia 180° apart, for example, 0 or 5, cannot be distinguished reliably. Thus, for example, when the computer commands the indicator 10 to show "0" and the indicator 10 was mechanically stuck at "5," the self-test circuitry does not indicate a failure. In practice, however, this limitation is not very serious, provided that the test is repeated either after each update of the indicators 10 or at least at occasional intervals. Thus, when after being positioned at "0," the command were subsequently changed to "1," a mechanical bind at "5" would immediately indicate a failure. Of course, as part of a preflight checkout, the computer 14 could sequence all the indicators 10 through "0," "1," "2," etc., positions. Subsequent testing would continue as described hereinbefore.

The self-test methods described also operate successfully in case of loss of power to the common of the indicator 11 or due to open or short of either the indicator windings, wiring, or the drive transistors. Loss of power causes failure indication invariably. Other failures are detected with less than 100 percent probability. Detection becomes virtually certain as described earlier when the self-test is repeated after new computer commands.

In summary, by pulsing the rotors 11 of electromagnetic indicators 10 in the manner described, an induced voltage on one of the stator windings which is of known polarity and magnitude is obtained when the rotor 11 is at the proper position. When the position is incorrect, other voltages are obtained which can be sensed by the demodulation means described. Therefore, built-in test equipment can be applied to indicators 11 in an actual system without modifying the design of the indicators 11. Advantageously, the indicators need not be visually read by a person; the error indication is automatic, independent of visual readings of the indicators. The indicators may be at any position; they needn't be set up to particular positions for a test. Testing can be continuously performed in an "on-time" basis, since it is not apparent that testing takes place; that is, the indicator does not appear to move. Hence, uninterrupted service and nondestructive testing are achieved without disturbing the operator.

It is to be understood that the embodiment described is merely illustrative and is not to be considered to be limiting of the invention in any manner whatsoever. As illustrated herein, NPN-transistors are used; however, of course, vacuum tubes, PNP-transistors, or other types of drive circuitry can be utilized without departing from the spirit and scope of the invention. The operational amplifier 61 may be of the 709 type, and the comparing amplifier 68 may be of the 710 type, by way of examples. Indicia other than numerical digits can be used, such as alphanumeric symbols, punctuation, etc. It is to be understood that the above-described arrangement of apparatus and methods are illustrative of applications of the principles of the invention and other modifications may be made without departing therefrom.

What is claimed is:

1. A method of testing an electromagnetic indicator of the type having a permanent magnet rotor with indicia spaced thereabout and fixed stator windings in association therewith, whereby energization of selected stator windings causes said rotor to position said indicia in a corresponding relationship, said method comprising, for a given one of said indicia, the steps of applying a first periodic electrical waveform to a first of said stator windings;

applying a second periodic electrical waveform to a second of said stator windings;

said electrical waveforms being of frequencies sufficiently high whereby said rotor does not rotate by application of said waveforms;

sensing the electrical waveform induced in a third of said stator windings;

comparing the magnitude and phase of the sensed waveform with a standard; and producing an error signal when either the sensed waveform is out of phase with said standard, or when the sensed waveform has a magnitude less than said standard.

2. The method as recited in claim 1 wherein said first and said second waveforms are square waves out of phase with each other, and occur at a fixed frequency rate, and wherein said sensed waveform is coupled to a point of reference potential at said fixed frequency rate.

3. A method of testing an electromagnetic indicator of the type having a permanent magnet rotor with indicia spaced thereabout, whereby energization of selected stator windings causes said rotor to position said indicia in a corresponding relationship, said method comprising, for a given one of said indicia, the steps of applying a first periodic electrical square waveform at a fixed frequency rate to a first of said stator windings;

applying a second periodic electrical square waveform at said fixed frequency rate, out of phase with said first waveform, to a second of said stator windings, said electrical waveforms being of frequencies sufficiently high whereby said rotor does not rotate by application of said waveforms;

sensing the electrical waveform induced in a third of said stator windings;

coupling said sensed waveform, periodically at said fixed frequency rate, to a point of reference potential, whereby half-wave sampling takes place;

amplifying and filtering the half-wave sampled waveform so as to yield a DC voltage;

comparing the yielded DC voltage versus a standard; and producing an error signal when the yielded DC voltage is of an insufficient magnitude.

4. A method of simultaneously testing a plurality of electromagnetic indicators of the type, each having a permanent magnet rotor with 10 numerical digits spaced thereabout whereby energization of one or two of five selected stator windings equally spaced cyclically about the rotor causes said rotor to position said digits in a corresponding relationship, said method comprising the steps of applying a first periodic electrical square waveform at a fixed frequency rate to the stator winding X for each indicator;

applying a second periodic electrical square waveform at said fixed frequency rate, out of phase with said first waveform, to the stator winding Y for each indicator, said electrical waveforms being of frequencies sufficiently high whereby said rotors do not rotate by application of said waveforms;

sensing the electrical waveforms induced in the stator winding Z for each indicator;

coupling said sensed waveforms, periodically at said fixed frequency rate, to a point of reference potential, whereby half-wave sampling takes place;

amplifying and filtering the half-wave sampled waveforms so as to yield DC voltages;

comparing the minimum yielded DC voltage versus a standard; and producing an error signal when the minimum yielded DC voltage is of an insufficient magnitude, wherein X, Y, and Z are cyclically numbered such that, to test for 0 or 5, X=5, Y=3, Z=4; to test for 1 or 6, X=3, Y=1, Z=2; to test for 2 or 7, X=1, Y=4, Z=5; to test for 3 or 8, X=4, Y=2, Z=3; and to test for 4 or 9, X=2, Y=5, Z=1.

5. Apparatus for testing an electromagnetic indicator of the type having a permanent magnet rotor with indicia spaced thereabout and fixed stator windings in association therewith, whereby energization of selected stator windings causes said rotor to position said indicia in a corresponding relationship, said apparatus comprising, for a given one of said indicia, means for applying a first periodic electrical waveform to a first of said stator windings;

means for applying a second periodic electrical waveform to a second of said stator windings;

said electrical waveforms being of frequencies sufficiently high whereby said rotor does not rotate by application of said waveforms;

means for sensing the electrical waveform induced in a third of said stator windings;

means for comparing the magnitude and phase of the sensed waveform with a standard; and means for producing an error signal when either the sensed waveform is out of phase with said standard, or when the sensed waveform has a magnitude less than said standard.

6. The apparatus as recited in claim 5 wherein said first and said second waveforms are square waves out of phase with each other, and occur at a fixed frequency rate, and wherein said sensed waveform is coupled to a point of reference potential at said fixed frequency rate.

7. Apparatus for testing an electromagnetic indicator of the type having a permanent magnet rotor with indicia spaced thereabout, whereby energization of selected stator windings causes said rotor to position said indicia in a corresponding relationship, said apparatus comprising, for a given one of said indicia, means for applying a first periodic electrical square waveform at a fixed frequency rate to a first of said stator windings;

means for applying a second periodic electrical square waveform at said fixed frequency rate, out of phase with said first waveform, to a second of said stator windings, said electrical waveforms being of frequencies sufficiently high whereby said rotor does not rotate by application of said waveforms;

means for sensing the electrical waveform induced in a third of said stator windings;

means for coupling said sensed waveform, periodically at said fixed frequency rate, to a point of reference potential, whereby half-wave sampling takes place;

means for amplifying and filtering the half-wave sampled waveform so as to yield a DC voltage;

means for comparing the yielded DC voltage versus a standard; and means for producing an error signal when the yielded DC voltage is of an insufficient magnitude.

8. Apparatus for simultaneously testing a plurality of electromagnetic indicators of the type, each having a permanent magnet rotor with 10 numerical digits spaced thereabout whereby energization of one or two of five selected stator windings equally spaced cyclically about the rotor causes said rotor to position said digits in a corresponding relationship, said apparatus comprising means for applying a first periodic electrical square waveform at a fixed frequency rate to the stator winding X for each indicator;

means for applying a second periodic electrical square waveform at said fixed frequency rate, out of phase with said first waveform, to the stator winding Y for each indicator, said electrical waveforms being of frequencies sufficiently high whereby said rotors do not rotate by application of said waveforms;

means for sensing the electrical waveforms induced in the stator winding Z for each indicator;

means for coupling said sensed waveforms, periodically at said fixed frequency rate, to a point of reference potential, whereby half-wave sampling takes place;

means for amplifying and filtering the half-wave sampled waveforms so as to yield DC voltages;

means for comparing the minimum yielded DC voltage versus a standard; and means for producing an error signal when the minimum yielded DC voltage is of an insufficient magnitude, wherein X, Y, and Z are cyclically numbered such that, to test for 0 or 5, X=5, Y=3, Z=4; to test for 1 or 6, X=3, Y=1, Z=2; to test for 2 or 7, X=1, Y=4, Z=5; to test for 3 or 8, X=4, Y=2, Z=3; and to test for 4 or 9, X=2, Y=5, Z=1.

9. Apparatus as recited in claim 8 wherein said means for amplifying and filtering the half-wave sampled waveforms, for each electromagnetic indicator, includes an operational amplifier, and a resistor and a capacitor, in parallel, coupled across the output and an input of said amplifier.

* * * * *